(12) United States Patent
Frauen et al.

(10) Patent No.: US 7,735,817 B2
(45) Date of Patent: Jun. 15, 2010

(54) DEVICE FOR TRANSPORTING COMPONENTS FOR TRANSPORTATION SYSTEMS

(75) Inventors: Holger Frauen, Hamburg (DE); Tomas Gnauck, Neu Wulmstorf (DE); Eike Klemkow, Schwerin (DE)

(73) Assignee: Airbus Deutschland GmbH, Hamburg (DE)

( * ) Notice: Subject to any disclaimer, the term of this patent is extended or adjusted under 35 U.S.C. 154(b) by 674 days.

(21) Appl. No.: 11/286,739

(22) Filed: Nov. 22, 2005

(65) Prior Publication Data

US 2006/0182558 A1 Aug. 17, 2006

(30) Foreign Application Priority Data

Nov. 22, 2004 (DE) .................. 10 2004 056 284

(51) Int. Cl.
*B65G 35/06* (2006.01)
(52) U.S. Cl. ...................................... 269/308; 410/84
(58) Field of Classification Search ............. 410/7, 410/30, 46, 47, 49, 54, 56, 57, 58, 65, 66, 410/67, 80, 84, 90, 91; 414/495, 498, 501, 414/222.04, 222.05, 222.06, 222.13, 225.01, 414/584, 589, 911; 269/308, 309, 900
See application file for complete search history.

(56) References Cited

U.S. PATENT DOCUMENTS 3,677,194 A * 7/1972 Barry .......................... 410/57
5,344,276 A * 9/1994 Juan

* cited by examiner

*Primary Examiner*—Stephen Gordon
(74) *Attorney, Agent, or Firm*—Christopher Paradies; Fowler White Boggs P.A.

(57) ABSTRACT

A device for transporting components for transportation systems between workstations comprises a transport apparatus and a positioning frame. The positioning frame is maintained on the apparatus and has a positioning element capable of aligning the position frame in the workstation. In one example, at least one positioning element arranged on the positioning frame allows alignment of components forming a section of an aircraft that is situated on at least one positioning frame in relation to workstations. During this process, connecting members are inserted into receptacle members arranged in the region of the floor area. The members may be at least partially form-fitted fashion. In order to adapt the device to sections with different dimensions, such as sections with different cross-sectional geometries and/or lengths, the device is provided with at least one supporting device for supporting the section that is mounted on the positioning frame, After depositing at least one positioning frame in the work station, the decoupled transport device may be used for transporting other sections.

10 Claims, 5 Drawing Sheets

DEVICE FOR TRANSPORTING COMPONENTS FOR TRANSPORTATION SYSTEMS

RELATED APPLICATION

This application claims the benefit of the filing date of German Patent Application No. 10 2004 056 284.9 filed Nov. 22, 2004, the disclosure of which is hereby incorporated herein by reference.

FIELD OF THE INVENTION

The field relates to a device for transporting components for transportation systems such as sections for aircraft, between work stations.

TECHNOLOGICAL BACKGROUND

Devices for transporting components, such as industrial trucks and trolleys are known. Such industrial trucks are used, for example, in complex production facilities for automatically transporting components between individual work stations, wherein the trucks are completely integrated into the sequence of manufacturing processes. For example, if the processing machines arranged in a work station have completed the processing of a component, the industrial truck with the component lying thereon automatically travels to the next work station, in which further processing steps are carried out. The processing machines in the work stations comprise, for example, standard industrial robots or articulated robots that are fitted with different tools.

In known devices that are equipped with industrial trucks, a component being transported into a work station is not separately aligned relative to the work station and the processing machines arranged therein. The attainable positioning accuracy of the industrial truck within the work station needs to suffice for the respective processing operations, which limits accuracy.

SUMMARY OF THE INVENTION

A device for transporting components, such as for transporting sections for aircraft, between different work stations provides for precise spatial alignment of the components forming the section relative to the processing machines installed in the respective work station.

According to one embodiment, a device for transporting components comprises a transport apparatus and a positioning frame. The one positioning frame is provided with at least one positioning element for the alignment of the components with the work station.

Due to the fact that at least one positioning frame is provided with at least one positioning element for achieving the alignment in the work station, the positioning frame with the section lying thereon may be aligned relative to the work station. The workstation includes processing machines that are aligned to the components prior to processing. According to one embodiment of the invention, the device not only allows an automated transfer of sections for aircraft between individual work stations, but also provides for their alignment in the respective work stations automatically, without the need for extensive manual realignment.

According to another embodiment, at least one transport apparatus is designed such that it may be coupled with and decoupled from a positioning frame by means of a coupling element. Due to these measures, a transport apparatus is able, although with a certain time lag, to transport several positioning frames with sections arranged thereon. According to another embodiment of the invention, at least one positioning frame may be aligned on a floor area by means of at least one positioning element. A section lying on a positioning frame may be more precisely aligned relative to the work station and the processing machines arranged therein.

According to another embodiment of the invention, at least one positioning frame is provided with at least one supporting device for accommodating at least one section in an at least regionally form-fitted fashion. A standardized positioning frame may be utilized for sections with different dimensions, such as different cross-sectional geometries and/or lengths, wherein receptacles that are respectively adapted to the different sections may be arranged on the positioning frame.

According to another embodiment of the invention, at least one supporting device is provided with at least one actuator for achieving an adaptation to sections with different shapes and/or dimensions, such as different cross-sectional geometries and/or lengths. In this embodiment, it may be sufficient to merely provide one universal receptacle for supporting different sections, such as sections with different cross-sectional geometries and/or lengths. In other words, a variety of different receptacles that are individually adapted to the respective sections may no longer be required to be available.

According to another embodiment of the invention, at least one positioning element is provided with at least one actuator with at least one connector, wherein at least one connector may engage into a receptacle situated in the region of the floor area in an at least regionally form-fitted fashion with the aid of at least one actuator in order to position the positioning frame relative to the floor area. Due to the at least regional form-fit between a connector and a receptacle, this embodiment may allow an exact positioning of the positioning frame relative to the floor area.

According to another embodiment of the invention, at least one positioning element is provided with at least one horizontally displaceable connector that may engage into a receptacle situated in the region of to floor area in an at least regionally form-fitted fashion in order to position the positioning frame relative to the floor area. Due to this, a "self-centering," "floating" alignment of the positioning frame on the floor area or within the work station, respectively, namely without requiring any actuators or the like may be produced.

According to another embodiment of the invention, at least one transport apparatus and/or at least one positioning frame includes at least one control unit. A control unit may allow for monitoring and control of approximately all sequential movements carried out within the device according to one embodiment of the invention.

According to another embodiment of the invention, at least one transport apparatus and/or at least one positioning frame is provided with at least one measuring device for determining the position relative to the floor area. This embodiment may determine an actual position of a transport apparatus and/or a positioning frame.

According to another embodiment, at least one transport apparatus may be controlled on the floor area by means of at least one guide. This embodiment may allow the control unit to be able to control a transport apparatus such that it may move on the floor area in a fully automated fashion.

In another embodiment of the invention, the mobility of at least one transport apparatus on the floor area in at least one dimension is achieved by providing the transport apparatus with at least one mobility element, such as wheels, rollers, balls, crawlers, air cushions, magnetic levitation systems, rail wheels or the like. This may ensure the mobility of the at least one transport apparatus on the floor area.

BRIEF DESCRIPTION OF THE DRAWINGS

The following embodiments are described with reference to the drawings.

DETAILED DESCRIPTION OF PREFERRED EMBODIMENTS

Figure 1:
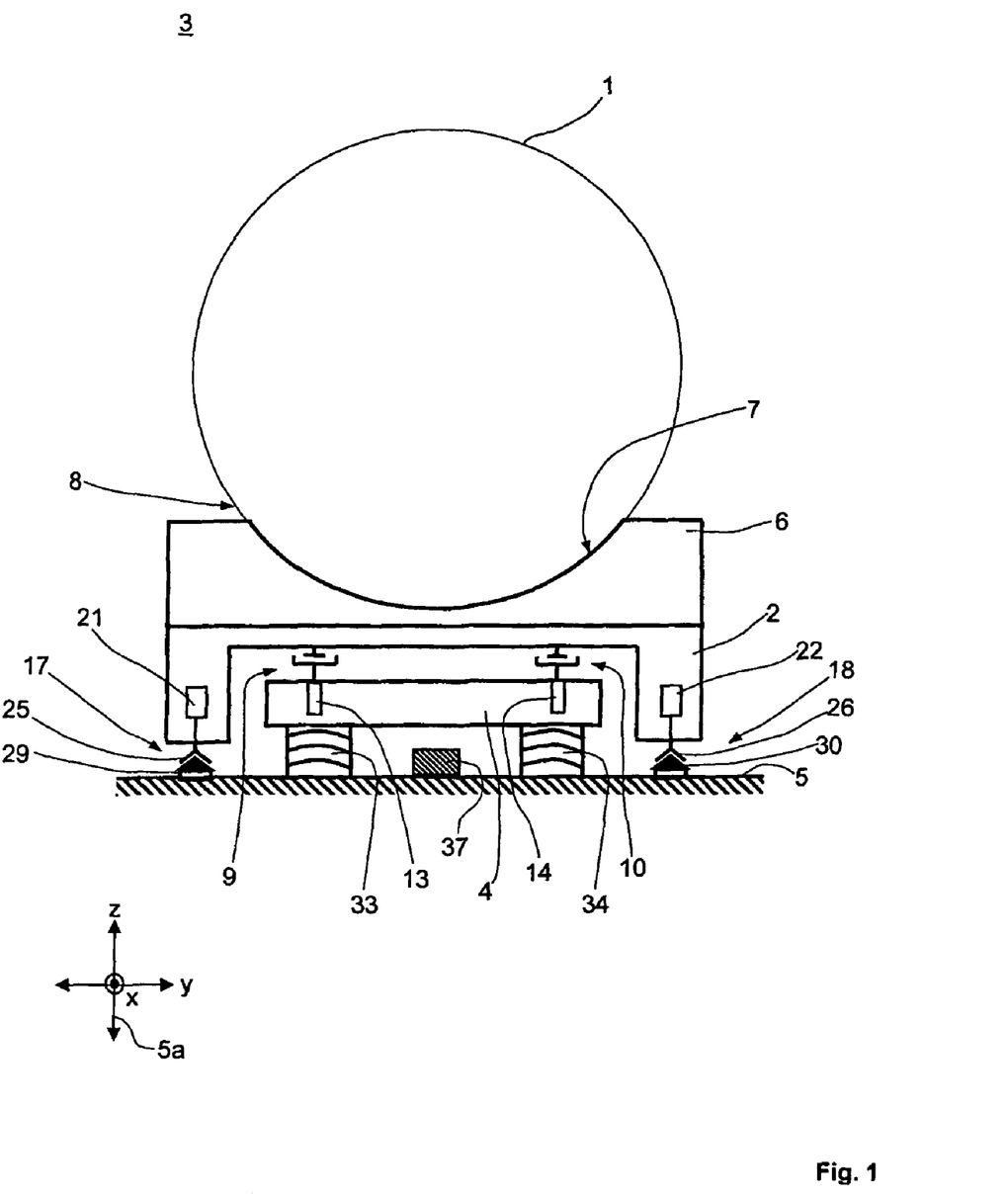
FIG. 1 shows a front view of one embodiment of the invention.

FIG. 1 shows a front view of an embodiment of the invention for transporting components, such as sections for aircraft. A section 1 of an aircraft lies on a positioning frame 2 that is situated within a work station 3. The positioning frame 2 is assigned to a transport apparatus 4 that is able to move on a floor area 5. A coordinate system 5a is illustrated in order to elucidate the x-, y- and z-directions in space. A supporting device 6 with a supporting surface 7 is situated between the section 1 and the transport apparatus 4. In this case, several supporting devices 6 with supporting surfaces 7 extend in the x-direction in order to prevent any deformation of, for example, a cylindrical section 1 lying thereon, for example. The supporting surface 7 has a fixed contour that approximately corresponds to the cross-sectional geometry of the section 1 referred to the x-direction within the respective supporting area. For example, if the section 1 has a cylindrical shape, the cross-sectional geometry in the x-direction is approximately constant. Although several supporting devices 6 need to be arranged successively offset on the positioning frame 2 in the x-direction in this case in order to achieve a sufficient supporting effect, the contour of the respective supporting devices 6 remains unchanged. However, if the cross-sectional geometry of the section 1 changes depending on the position in the x-direction, several supporting devices 6 that individually conform to the changing contour of the section 1 in the x-direction may be required. Several supporting devices 6 may need to be available for each different cross-sectional geometry of the sections. In some cases, this may significantly increase the manufacturing and storage expenditures for the supporting devices 6. Consequently, the supporting devices are preferably realized such that they may be removed from the positioning frame 2.

The supporting devices 6 may also be in the form of a uniform, integral supporting device such that a continuous supporting surface is formed. The section 1 lies directly on the supporting surface 7. The supporting surface 7 is realized in an at least regionally form-fitted fashion referred to the underside 8 of the section in order to minimize possible deformations of the section 1 due to its own weight. The supporting device 6 is non-positively connected to the positioning frame 2 with the aid of a detachable connecting mechanism that is not illustrated in detail. The connecting mechanism may be removed from the positioning frame, if so required. Any of many well known detachable connecting mechanisms may be used. The supporting device 6 may serve to conform the positioning frame 2 to different types of sections, such as conforming to sections with different cross-sectional geometries and/or lengths.

Figure 2:
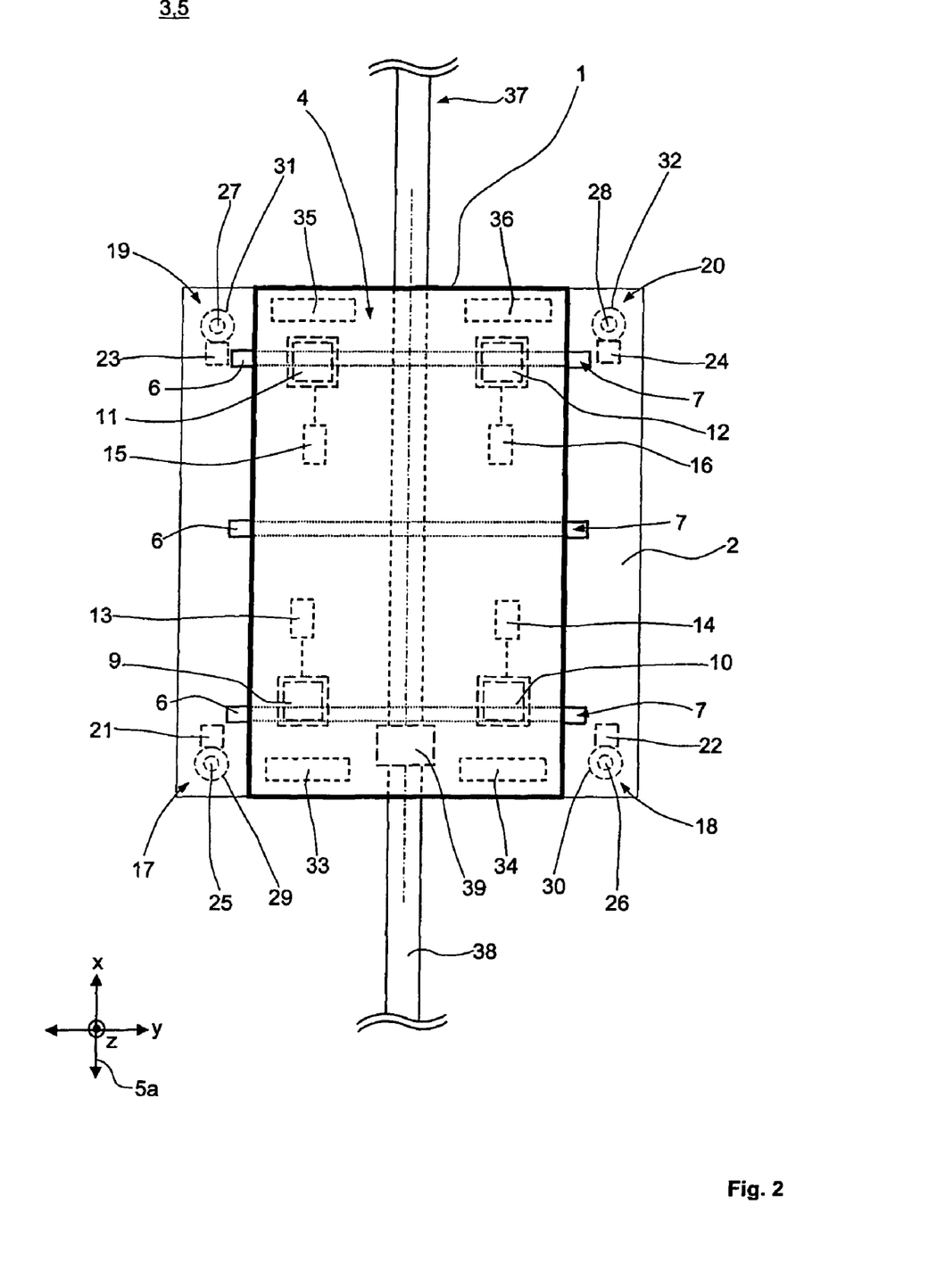
FIG. 2 shows a top view of an embodiment of the invention.

The positioning frame 2 is detachably connected to the transport apparatus 4 with three or four coupling elements 9, 10, 11, 12, wherein the coupling elements 11, 12 lie in the background referred to the plane of projection, i.e., these coupling elements are concealed by the coupling elements 9, 10 and therefore not visible as illustrated in FIG. 2. The coupling elements 9, 10, 11, 12 may allow the transport apparatus 4 to lower and deposit the positioning frame 2, for example, in a work station 3. Therefore, a large number of positioning frames with supporting devices arranged thereon may be moved with a comparatively small number of transport apparatuses that have a much more complicated constructive design.

In order to lower the positioning frame 2, the coupling elements 9, 10, 11, 12 are provided with a total of four actuators 13, 14, 15, 16, wherein the actuators 15, 16, are concealed like the coupling elements 11, 12 in the embodiment shown in FIG. 1. During a transport phase, the actuators 13-16 may be at least partially extended such that the transport apparatus 4 with the positioning frame 2 arranged thereon is able to freely move on the floor area 5. Once the transport apparatus 4 reaches the desired destination, the actuators 13-16 may be at least partially retracted again during a subsequent positioning phase such that the positioning frame 2 may be lowered onto the floor area 5. It is advantageous that all four actuators 13-16 on the coupling elements 9-12 are retracted simultaneously in order to achieve a uniform and largely horizontal lowering of the positioning frame 2 onto the floor area 5. Subsequently, the transport apparatus 4 may be moved from its position underneath the positioning frame 2 and used for transporting other sections to other work stations. In contrast to the above-described embodiment, a different number of coupling elements and/or actuators on the transport apparatus 4 may also be provided. A transport apparatus 4 may be provided that is capable of being raised and lowered rather than having to equip a plurality of positioning frames with complicated lifting devices in addition to the active or passive positioning elements required for positioning purposes.

The supporting device 6 is adapted to the special geometry of a section type. Consequently, specially adapted supporting devices need to be available for different sections, for example, for sections with different dimensions, such as with different cross-sectional geometries and/or lengths. For example, the curvature radius of the supporting surface 7 of a supporting device 6 should correspond as accurately as possible to the curvature radius of the section 1. The positioning frame 2 is also provided with four positioning elements 17, 18, 19, 20, of which only the positioning elements 17, 18 are visible in FIG. 1 and positioning elements 19, 20 are visible in FIG. 2 respectively. The respective positioning elements 17-20 are provided with four actuators 21, 22, 23, 24 and four connecting members 25, 26, 27, 28. In FIG. 1, the actuators 23, 24 and the connecting members 27, 28 are concealed in the background referred to the plane of projection and are therefore not visible. FIG. 2 schematically illustrates the location of the actuators 23, 24 and the connecting members 27, 28, for example. A different number and position of positioning elements, connecting members and actuators connected thereto may also be used. When the positioning frame 2 is lowered by controlling the actuators 13-16 arranged on the coupling elements 9, 10, 11, 12, the connecting members 25, 26, 27, 28 insert into receptacles 29, 30, 31, 32 that are realized in an at least regionally form-fitted fashion for this purpose. These receptacles 29, 30, 31, 32 are situated in the region of the floor area 5, serving as reference points for the exact positioning of the positioning frame 2 within the work station 3. The alignment of receptacle, 31, 32 with the connecting members 27, 28 is shown schematically in FIG. 2.

It is believed without being limiting in anyway that the positioning frame 2 may be very precisely positioned relative to the processing machines situated within the work station 3 using this alignment method. A high-precision positioning of the positioning frame 2 relative to the work station 3 may also be achieved by controlling the actuators 21-24 arranged on the positioning elements 17-20 individually. At least one of the positioning elements 17-20 and at least one of the connecting means 25-28 may carry out an active movement in at least the z-direction of the coordinate system 5a. With respect to the x- and/or the y-direction of the coordinate system 5a, the positioning elements 17-20 and the connecting means 25-28 28 may be respectively realized, if so required, such that they may be actively moved by means of the actuators 21-24 or passively without the assistance of any actuators. In one example, the receptacle means 29-32 may be rigidly connected to the floor area 5 within the work station 3.

All actuators 13-16 as well as 21-24 are controlled by a not illustrated control unit (not shown) that is well known in the art. The actuators may be controlled by a control unit that is situated in the region of the positioning frame 2 or the transport apparatus 4, respectively, or by a control unit that is directly arranged in the respective work station 3, for example.

The positioning frame 2, as well as the transport apparatus 4, may be equipped with a measuring device (not shown) for determining the exact position of the transport apparatus 4, the positioning frame 2 and the section 1 situated thereon relative to the floor area 5 or the work station 3, respectively. The measuring device may be a laser measuring device, for example. The measuring values acquired by the measuring device are forwarded to the control unit in order to control the actuators 13-16 and/or actuators as 21-24 and, if so required, correct the position of the positioning frame 2. In this case, the connecting means 25 is inserted into the receptacle means 29, and the connecting means 26 is inserted into the receptacle means 30, etc.

In FIG. 2, the transport apparatus 4 is also provided with mobility elements 33, 34, 35, 36 that are preferably arranged on its underside and serve for moving the transport apparatus on the floor area 5. The mobility elements 35, 36 are concealed in the background in FIG. 1 and therefore not graphically illustrated (see FIG. 2). The mobility elements 33-36 may be realized, for example, in the form of wheels, rollers, balls, crawlers, air cushions, magnetic levitation elements, rail wheels or the like. If the mobility elements 33-36, such as magnetic levitation elements, are unsuitable for achieving a direct drive of the transport apparatus 4, then the transport apparatus 4 may be displayed by driving elements (not shown), such as electric motors, hydraulic motors or the like, which are ell known in the art.

The coupling elements 9-12 may contribute to the lowering movement of the positioning frame 2 in the work station 3, or the mobility elements 33-36 of the transport apparatus 4 may be utilized for this purpose by positioning the positioning frame 2 in the z-direction or vertical direction with the aid of actuators (not shown). Alternatively, the mobility elements 33-36 may be realized, for example, in the form of running wheels that are connected to the positioning frame 2 by means of a rotatable and height-adjustable wheel receptacle. The rotatable and height-adjustable wheel receptacle may be controlled by a control unit (not shown), which is well known in the art.

A device may be provided with at least one guiding means 37. The guiding means 37 may be rail-like guides that are arranged parallel to one another, for example. The mobility elements 33-36 of the transport apparatus 4 may be rail wheels that are capable of rolling on the guides. The transport apparatus 4 therefore is able to travel on rail wheels inside and outside the work station 3, while being monitored by the control unit. Alternatively, some manual control of the device may be permitted with the aid of a remote-control, telecontrol or the like. If mobility elements 33-36 are wheels, rollers, balls, crawlers, air cushions or magnetic levitation elements, multi-dimensional control needs to be carried out by the control unit in connection with the guiding means 37 because the transport apparatus 4 is able to move with more than one degree of freedom or in one direction. In this case, it may be necessary to determine the position of the transport apparatus 4 as accurately as possible in at least two dimensions, for example, in the x-direction and in the y-direction, such that it may be moved in a controlled fashion inside and outside the work station 3 by actuating the mobility elements 33-36 accordingly. In one example, the one or more guiding means 37 are contactless, such as in the form of induction loop systems or laser- or microwave-controlled guidance and routing systems. The control unit is capable of determining the position and correcting the respective position of the transport apparatus 4, based on the signals generated by the contactless guiding means 37.

If the mobility elements 33-36 are magnetic levitation elements or air cushions, the control unit corrects the position of the transport apparatus 4, if so required, by directly influencing these elements. However, if the mobility elements 33-36 consist of wheels, rollers, balls, crawlers, rail wheels or the like, the position of the transport apparatus 4 is preferably corrected by influencing the driving elements assigned to the mobility elements 33-36, directly.

According to an one embodiment of the invention, a highly precise correction of the position of the positioning frame 2 within the work station 3 may be achieved, with the aid of the positioning elements 17-20. Then, the position of the transport apparatus 4 need not be corrected by actuating the mobility elements 33-36, directly. The mobility elements 33-36 may merely serve to roughly position the transport apparatus 4 within the work station 3 and for the mobility of the transport apparatus 4 outside the work station 3 in the region of the floor area 5.

FIG. 2 shows a top view of the device according to one embodiment of the invention. The section 1 rests on the supporting devices 6. Only three supporting devices 6 with supporting surfaces 7 are illustrated in order to provide a better overview. In this respect, a different number of supporting devices 6, such as for sections 1 of greater lengths in order to prevent deformations may be provided. Structural elements that are situated underneath the section 1 and the positioning frame 2 with the supporting devices 6 and therefore concealed are illustrated with broken lines in FIG. 2. The coordinate system 5a is illustrated in the region of the work station 3 or the floor area 5, respectively, in order to elucidate the x-, y- and z-directions in space. The coupling elements 9-12 with the assigned actuators 13-16 are situated in a region underneath the supporting device 6. The positioning elements 17-20 are also arranged underneath the supporting device 6. The positioning elements 17-20 may be respectively controlled independently of one another by the actuators 21-24. The positioning elements 17-20 comprise the connecting means 25-28 as well as the receptacle means 29-32 that are situated in the region of the floor area 5 and realized in an at least regionally corresponding fashion for this purpose.

The mobility elements 33-36 may be arranged in the face regions or on the ends of the transport apparatus 4 such that they respectively lie as close as possible to the longitudinal sides. This may ensure a sufficient safety against overturning while the transport apparatus 4 and the section 1 lying thereon are in motion. The coupling elements 9-12, the actuators 13-16, the positioning elements 17-20, the actuators 21-24, the connecting means 25-28, the receptacle means 29-32 and the mobility elements 33-36 may also be provided in different numbers and/or arrangements than shown in FIG. 2.

A guide 37 is situated underneath the transport apparatus 4, in the example shown in FIG. 2. The guide 37 is realized in the form of an induction loop 38 that continues upward and downward. A sensor 39 arranged on the transport apparatus 4 allows the control unit to determine and to adjust the position of the transport apparatus 4 relative to the induction loop 38 or the floor area 5, respectively.

Instead of controlling the transport apparatus 4 by means of an induction loop 38, a guide beam or the like, such as a laser or microwave guide beam may be utilized. Alternatively, markings that may be interpreted by the sensor 39 may be arranged in the region of the floor area 5. In another alternative, the transport apparatus 4, includes a camera system for the autonomous navigation on the floor area 5, which may be aided by markings on the floor area 5.

Figure 3:
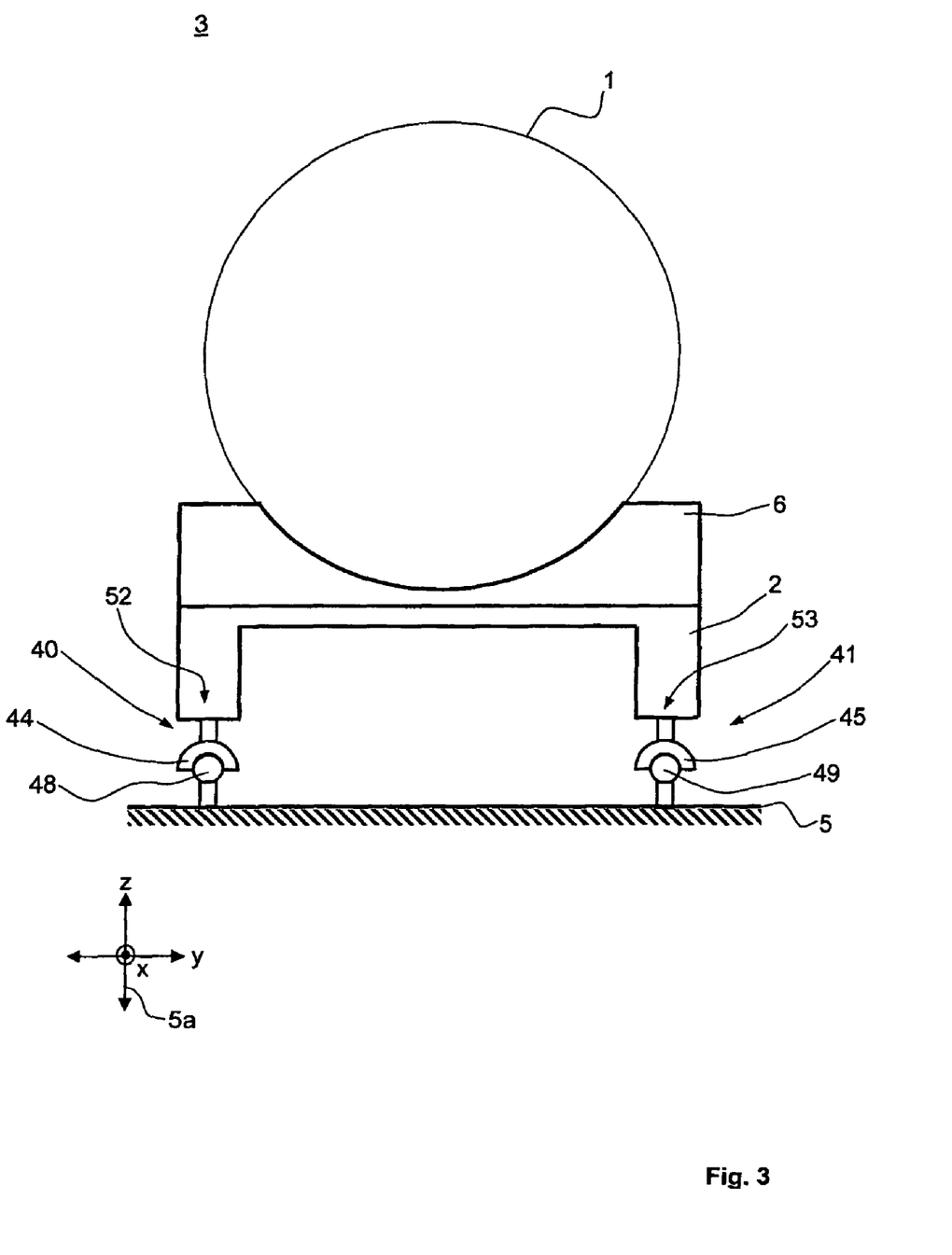
FIG. 3 shows a front view of another embodiment of the present invention.

FIG. 3 shows a front view of a variation of the embodiment of the invention that allows for the positioning frame 2 to be positioned within the work station 3 with reduced control cost. The section 1 rests on several supporting devices, of which only the supporting device 6 is illustrated in the figure. The supporting device 6 is arranged above the positioning frame 2. The positioning elements 40, 41, 42, 43 comprise the connectors 44, 45, 46, 47 as well as the receptacles 48, 49, 50, 51 that are realized in an at least regionally form-fitted fashion for this purpose. A number of positioning elements that deviates from the four positioning elements shown may be provided. The positioning elements 42, 43 lie behind the plane of projection in the y-direction and therefore are not illustrated in FIG. 3. The connectors 44-47 are accommodated in the receptacles 48-51 in order to position and align the positioning frame 2 relative to the floor area 5. The connectors 46, 47 as well as the receptacles 50, 51 corresponding thereto are concealed in FIG. 3 and lie behind the connecting means 44, 45 and the receptacle means 48, 49 referred to the y-direction (see FIG. 4).

The connectors 44-47 are ball sockets in the embodiment shown. Alternately, the connectors 44-47 may also be produced, for example, in a conical fashion. In one example, the receptacles 48-51 are balls that are capable of being inserted into the ball sockets of the connectors 44-47. The balls may be form-fitted to the ball sockets. Alternately, the receptacles 48-51 may also be formed, for example, in a conical fashion, in which case the connectors 44-47 have a corresponding conical inside contour in order to achieve a form-fitted coupling. The receptacles 48-51 may be precisely surveyed relative to the floor area 5 and relative to the work station 3, and the corresponding space coordinates are stored in the control unit. Therefore, the exact position of the section 1 relative to the floor area 5 and the work station 3 may be known. A few of the connectors 44-47 may be displaced in the x-direction of the coordinate system 5a without actuators. This may reduce the control expenditure in comparison with the positioning frame 2 of FIGS. 1 and 2.

Figure 4:
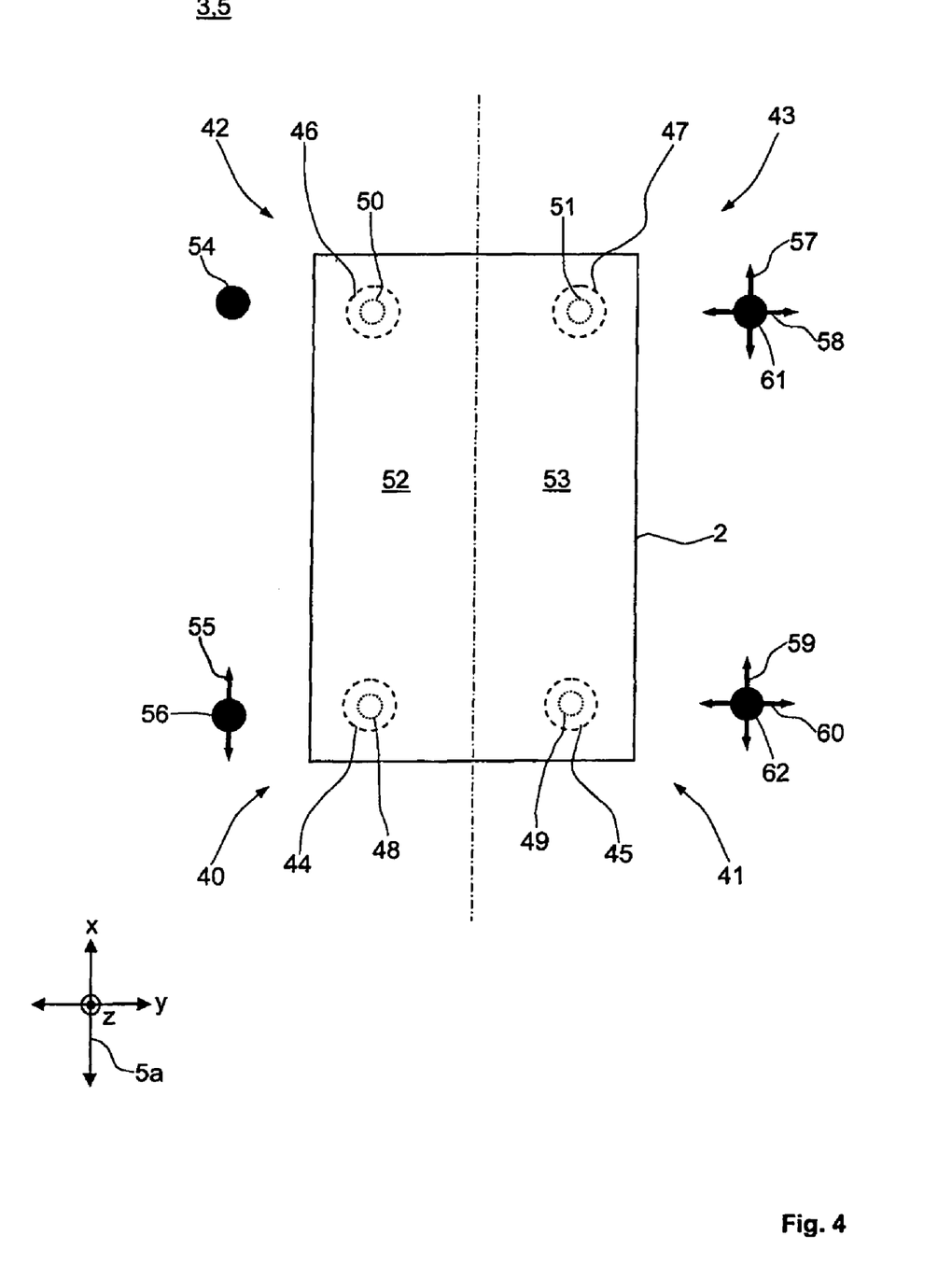
FIG. 4 shows a schematic representation of the passive displacement of the connector of the positioning frame according to the embodiment of FIG. 3.

FIG. 4 shows a schematic representation of a passive displacement of the connecting means 44-47 of the positioning frame 2 according to the example in FIG. 3. The positioning elements 40-43 as well as the receptacles 48-51 are shown. The positioning frame 2 is illustrated without supporting devices 6 and without a section 1 lying thereon for the sake of clarity. A few of the connectors 44-47 are produced such that they may be displaced at least in the x-direction in the region of the longitudinal undersides 52, 53 of the positioning frame 2 in order to place the positioning frame 2 onto the receptacles 48-51 in a largely stress-free fashion, as well as to realize the positioning relative to the floor area 5 and within the work station 3. In addition, the ability to passively displace the connectors 44-47 allows a "self-centering" or "floating" alignment of the positioning frame 2 on the receptacles 48-51 with a low constructive expenditure. In contrast to the embodiments according to FIGS. 1 and 2, actuators for respectively positioning the positioning elements 40-43 independently of one another are not required. The connector 46 is rigidly connected to the positioning frame 2, as it may not be displaced in the x-, the y- or the z-direction of the coordinate system 5a. This is symbolized by the circle 54 that is filled in with black. The connector 44 may be displaced in the direction of the black double arrow 55 only, i.e., parallel to the x-direction of the coordinate system 5a. In the y-direction and in the z-direction, the connecting means 44 is also rigidly connected to the positioning frame 2. This is symbolized with respect to the z-axis by the circle 56 that is filled in with black and with respect to the y-axis by the missing double arrow. The connectors 45 and 47, in contrast, may be freely displaced in the x- as well as the y-direction of the coordinate system 5a or parallel to the floor area 5 of the work station 3, respectively. This is indicated by the black double arrows 57, 58, 59, 60. However, none of the connectors 44-47 may be displaced in the z-direction, as they, i.e., are rigidly connected to the positioning frame 2 in the region of the longitudinal undersides 52, 53 as symbolized by the circles 54, 56 as well as 61 and 62 that are filled in with black. All movements of the connectors 44-47 may be realized passively, i.e., without the influence of any actuators.

In comparison with the practical variation of the positioning frame 2 according to FIGS. 1, 2, the control expenditure is reduced, because no actuators are provided for positioning the connectors 44-47. This may be relevant if a plurality of positioning frames with one respective section assigned thereto need be available in order to simultaneously process the sections in several work stations. The constructive expenditure with respect to the transport apparatus 4, is negligible if only one transport apparatus suffices for the transport between the work stations.

Figure 5:
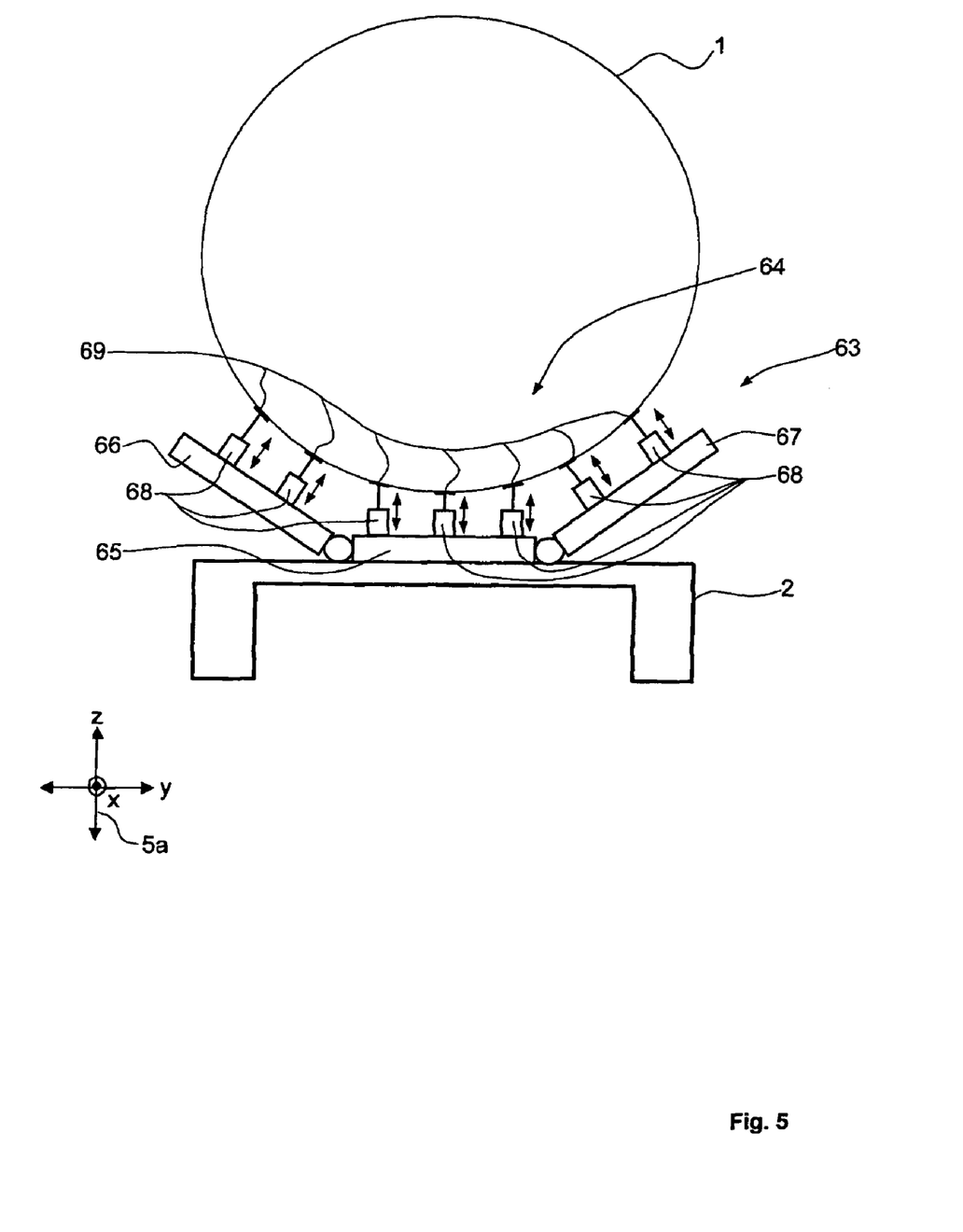
FIG. 5 shows an embodiment of a support for sections.

FIG. 5 finally shows another embodiment with supporting devices that may be adapted to sections with different shapes and/or dimensions, such as different cross-sectional geometries, with the aid of several actuators. Special supporting devices for each section with a different cross-sectional geometry and/or dimensions are not necessary in this example. Several supporting devices may be adapted by means of actuators that are arranged on the positioning frame 2 in order to accommodate the section 1. Only one supporting device 63 with a supporting surface 64 is illustrated in FIG. 5. Substantially perpendicular to the plane of projection, other correspondingly designed supporting devices with flexible supporting surfaces may be arranged behind the flexible supporting device 63, such that the additional supporting device are spaced apart from the supporting device 63 and offset in the x-direction in order to largely prevent deformations of the section 1. Once again, the coordinate system 5a is illustrated in order to elucidate the x-, the y- and the z-direction in space. The number of required supporting devices 63 approximately depends on the geometric shape of the section 1 to be accommodated, such as its cross-sectional dimensions and/or length.

The supporting device 63 may comprise a holder 65 for connecting the supporting device 63 to the positioning frame 2, preferably in a detachable fashion. Since the travel of the actuators is limited, the holder 65 is provided with two holding arms 66, 67 that are connected to the holder 65 in an articulated fashion on both sides thereof in order to conform to sections 1 with different curvature radii or cross-sectional geometries. Several actuators 68 are arranged on the holder 65 as well as the holding arms 66, 67 and uniformly spaced apart from one another. The actuators 68 may allow for positioning of supporting elements 69 relative to an outside surface of the section 1 independently of one another, substantially perpendicularly along the small black double arrows. If a sufficient number of supporting elements 69 is provided, the section 1 may be accommodated on the supporting surface 64 in a nearly ideal and largely deformation-free fashion. Depending on the geometric requirements, the number of actuators may also deviate from the seven actuators 68 with one respective supporting element 69 in the embodiment shown.

The above-described embodiments may allow for accommodation of a plurality of sections 1, such as with different cross-sectional geometries and/or cross-sectional dimensions on only one arrangement that comprises several flexible supporting devices 63 with supporting surfaces 64. Consequently, the expenditure with respect to the storage and the availability of different supporting devices 63 are believed to be reduced. However, this flexibility may require a higher constructive expenditure for the positioning frame 2 and the supporting devices 63.

Implementation of the invention is not limited to the preferred embodiments shown in the figures. Instead, multiple variations are possible and will be readily apparent based on the examples described herein.

List of Reference Symbols
1 Section
2 Positioning frame
3 Work station
4 Transport apparatus
5 Floor area
5a Coordinate system
6 Supporting device
7 Supporting surface
8 Underside of section
9 Coupling element
10 Coupling element
11 Coupling element
12 Coupling element
13 Actuator
14 Actuator
15 Actuator
16 Actuator
17 Positioning element
18 Positioning element
19 Positioning element
20 Positioning element
21 Actuator
22 Actuator
23 Actuator
24 Actuator
25 Connector
26 Connector
27 Connector
28 Connector
29 Receptacle
30 Receptacle
31 Receptacle
32 Receptacle
33 Mobility element
34 Mobility element
35 Mobility element
36 Mobility element
37 Guiding means
38 Induction loop
39 Sensor
40 Positioning element
41 Positioning element
42 Positioning element
43 Positioning element
44 Connector
45 Connector
46 Connector
47 Connector
48 Receptacle
49 Receptacle
50 Receptacle
51 Receptacle
52 Longitudinal underside
53 Longitudinal underside
54 Circle
55 Double arrow
56 Circle
57 Double arrow
58 Double arrow
59 Double arrow
60 Double arrow
61 Circle
62 Circle
63 Supporting device
64 Supporting surface
65 Holder
66 Holding arm
67 Holding arm
68 Actuator
69 Supporting element

What is claimed:

1. A device for transporting components forming a section of an aircraft between work stations, the work stations being located on a floor area having at least one receptacle within the floor area, the device comprising:
    the at least one receptacle;
    at least one transport apparatus; and
    at least one positioning frame mounted on the at least one transport apparatus wherein the at least one positioning frame comprises at least one positioning element for the alignment of the components in the work stations, wherein the at least one positioning frame is capable of being aligned on the floor area by contacting the at least one positioning element on the at least one receptacle within a first region of the floor area wherein the at least one transport apparatus has at least one coupling element being adapted to be coupled to and decoupled from the at least one positioning frame using the at least one coupling element such that the at least one transport apparatus disengages from the at least one positioning frame, while the at least one positioning element is retained on the at least one receptacle leaving the at least one positioning frame in position within the first region of the floor area as the at least one transport apparatus becomes separately displaceable to a different location on the floor area.

2. The device of claim 1, wherein the at least one positioning frame further comprises at least one supporting device for supporting at least a portion of the components which form the section of the aircraft in a form-fitted fashion.

3. The device of claim 2, wherein the at least one supporting device includes an actuator for conforming the at least one supporting device in a form-fitted fashion to each of a plurality of sections having different shapes, different dimensions or both different shapes and different dimensions.

4. The device of claim 1, wherein the at least one positioning element comprises at least one actuator acting on at least one first connector, and the at least one first connector is at least partially form-fitted for insertion into the at least one receptacle by controlling the at least one actuator such that the at least one positioning frame is capable of being positioned relative to the floor area.

5. The device of claim 4, wherein the at least one positioning element further comprises at least one horizontally displaceable second connector capable of being form-fitted in at least a portion of a second receptacle located in the first region of the floor area such that the at least one positioning frame is aligned relative to the floor area.

6. The device of claim 1, wherein at least one of the at least one transport apparatus and the at least one positioning frame are coupled with at least one control unit.

7. The device of claim 1, further comprising at least one measuring device capable of determining position of the at least one transport apparatus or the at least one positioning frame relative to the floor area.

8. The device of claim 1, further comprising a guide, wherein the at least one transport apparatus is controllable on the floor area by the guide.

9. The device of claim 1, wherein the at least one transport apparatus comprises a mobility element selected from the mobility elements consisting of wheels, rollers, balls, crawlers, air cushions, magnetic levitation systems and rail wheels such that displacement of the at least one transport apparatus on the floor area is enabled in at least one direction.

10. The device of claim 1, wherein the at least one positioning element is adapted to contact the at least one receptacle in at least a regionally form-fitted fashion for aligning the at least one positioning frame within the first region of the floor area.

* * * * *